Sept. 3, 1935.   S. S. GINSBURG   2,013,269
UMBILICAL CORD GUARD
Filed June 15, 1934

INVENTOR.
S. S. GINSBURG
BY Munn, Anderson & Liddy
ATTORNEYS.

Patented Sept. 3, 1935

2,013,269

UNITED STATES PATENT OFFICE 2,013,269

UMBILICAL CORD GUARD

Samuel S. Ginsburg, Visalia, Calif.

Application June 15, 1934, Serial No. 730,807

5 Claims. (Cl. 128—346)

My invention relates to improvements in umbilical cord guards, and it consists of the combinations, constructions and arrangements hereinafter described and claimed.

Difficulties have been experienced in tying the umbilical cord so that the cord will be held closed at all times. The cord during the drying period shrinks in size and this very often necessitates the retying of the cord and the accompanying danger of infecting the baby. Also, if the doctor is not careful, a hemorrhage will result, or even umbilical hernia is possible.

The main object of the present invention is to provide an all metal umbilical cord guard which may be quickly attached to the cord, and which has yielding means for engaging with the outer wall of the cord for closing the cord. The means engaging with the outer cord wall exerts a yielding pressure against the wall so as to automatically restrict the space around the cord as the latter dries. This will result in a smooth, even surface when the cord is separated and will accelerate the separation time. It is obvious that the device will prevent hemorrhage because it will constantly exert a yielding force on the cord, and this will be sufficient to keep the cord closed at all times regardless of the size of the cord.

The device is extremely simple in construction and since it is made of only metal parts, it can be readily sterilized prior to use.

Other objects and advantages will appear in the following specification, and the novel features of the device will be particularly pointed out in the appended claims.

My invention is illustrated in the accompanying drawing forming a part of this application, in which Figure 1 is a plan view of the device;

Figure 4:
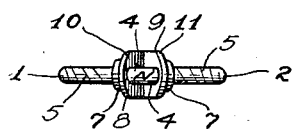
Figure 4 is a top plan view of Figure 1.

In carrying out my invention I provide a ring indicated generally at A, this ring having two parts 1 and 2, hinged at 3, and having their opposite ends provided with catches 4, see Figure 4. The surface of the ring is preferably corrugated as at 5 in order to prevent the ring from slipping from the doctor's hands when being used.

Figure 1:
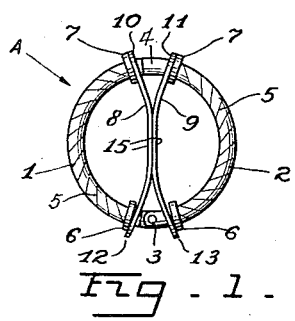

Shoulders 6—6 and 7—7 are provided near the ends of the ring sections 1 and 2, and are integral with the ring. Leaf springs 8 and 9 have their ends 10 and 11 anchored to the shoulders 7—7 of the ring sections 1 and 2 respectively, and have their other ends 12 and 13 slotted as at 14, see Figure 3, for straddling the ring sections 1 and 2. The ends 12 and 13 abut against the shoulders 6—6 when the ring is in closed position, see Figure 1.

Figure 3:
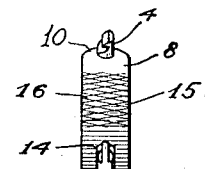
Figure 3 is a section along the line 3—3 of Figure 2.

Each leaf spring has a flat portion 15 disposed near the center of the ring, and then the ends of the leaf spring are curved so that the adjacent ends of the two leaf springs diverge away from each other in curved lines. Figure 3 shows the inner surface of one of the leaf springs and it will be noted that this surface may be marked with intersecting lines 16 in order to afford a perfect gripping surface.

From the foregoing description of the various parts of the device, the operation thereof may be readily understood.

Figure 2:
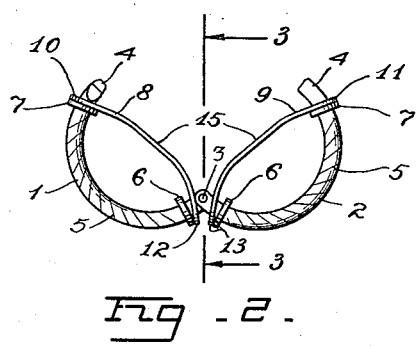
Figure 2 is a similar view which shows the device in open position.
Figure 5:
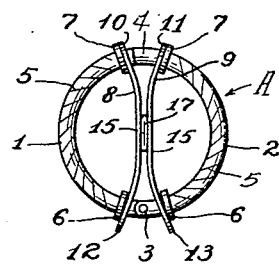
Figure 5 shows the device operatively applied.

In using the ring, it is first opened up in the manner shown in Figure 2, and then the two sections 1 and 2 are closed around the cord so that the ring itself is positioned adjacent to the body of the baby. The openings between the leaf springs and the rear sections 1 and 2 permit good visibility so that the doctor can see the work as it progresses. The closing of the two ring sections does away with the necessity of threading the ring over the cord and permits the ring sections to be moved laterally with respect to the cord until the portions 15 of the leaf springs 8 and 9 grip the cord. In Figure 5 I show how the cord 17 is gripped between the portions 15 of the leaf spring. The curvature of the leaf springs is such that when the two ring sections are brought together, the leaf springs will be compressed slightly. The slots 14 permit this movement. The pressure is sufficient to close the cord and to automatically move the portions 15 toward each other as the cord dries. In this way a simple means is provided for continuously exerting a sufficient force on the cord to keep it closed regardless of the size of the cord. There is no need of removing the device after it is once applied, and this precludes any infection taking place. Since the cord guard is made of all metal parts it facilitates the sterilizing of the device.

As already stated hemorrhage is prevented due to the constant graduated compression of the leaf springs on the cord until the separation of the cord takes place. It will also be noted that it is easy to apply the guard to the cord since the movement is lateral with respect to the cord. There is no obstruction in the operative field of the device because, as already stated, the device has spaces between the leaf springs and the ring sections through which the operation may be viewed. I have found that the constant pressure against the cord due to the force of the leaf springs accelerates the separation time of the cord, and will leave a smooth even surface. The device will prevent umbilical hernia because the compression of the leaf springs is controlled by the cord resistance and the flexibility of the springs.

While I have shown only the preferred form of my invention, it should be understood that various changes or modifications may be made within the scope of the appended claims without departing from the spirit of the invention.

I claim:

1. An umbilical cord guard comprising a ring for encircling the cord and having two parts hinged together at one of their ends and having their other ends provided with hooks for holding the ring in closed position, an arcuate-shaped leaf spring carried by each part, said spring having one of its ends anchored adjacent to the hook-shaped end of the ring part and having its other end bifurcated and straddling the ring part at a point adjacent to the hinge, and a shoulder on the ring part against which the bifurcated end presses when the ring is closed.

2. An umbilical cord guard comprising a ring for encircling the cord and having two parts hinged together at one of their ends and having its other end provided with hooks for holding the ring in closed position, an arcuate-shaped leaf spring carried by each part, said spring having one of its ends anchored adjacent to the hook-shaped end of the ring part and having its other end bifurcated and straddling the ring part at a point adjacent to the hinge, and a shoulder on the ring part against which the bifurcated end presses when the ring is closed, the surface of the ring and the opposed surfaces of the leaf springs being roughened for aiding in gripping.

3. An umbilical cord guard comprising a ring for encircling the cord, said ring being composed of two parts hinged together at one of their ends and having their other ends provided with means for removably securing them together, and an arcuate-shaped leaf spring carried by each part, each spring having its ends connected adjacent to the ends of its supporting part.

4. An umbilical cord guard comprising a ring for encircling the cord, said ring being composed of two parts hinged together at one of their ends and having their other ends provided with means for removably securing them together, and an arcuate-shaped leaf spring carried by each part, each spring having its ends connected adjacent to the ends of its supporting part, each leaf spring having one end anchored to its supporting part and its other end slidably secured to the same part.

5. An umbilical cord guard comprising a ring for encircling the cord, said ring being composed of two parts hinged together at one of their ends and having their other ends provided with means for removably securing them together, and an arcuate-shaped leaf spring carried by each part, each spring having its ends connected adjacent to the ends of its supporting part, each leaf spring having one end anchored to its supporting part and its other end slidably secured to the same part, each ring part having a support for the sliding end of the spring.

SAMUEL S. GINSBURG